(12) United States Patent
Jin

(10) Patent No.: US 11,859,494 B2
(45) Date of Patent: Jan. 2, 2024

(54) COMBINED CIRCULATING SYSTEM OF MICRO GAS TURBINE, TRANSPORTATION MEANS AND CHARGING SYSTEM

(71) Applicant: TECHNOLOGIES' XANADU OF RESONATORY-SOLAR-SYSTEMED CO., LTD, Beijing (CN)

(72) Inventor: Pu Jin, Beijing (CN)

(73) Assignee: TECHNOLOGIES' XANADU OF RESONATORY-SOLAR-SYSTEMED CO., LTD, Beijing (CN)

( * ) Notice: Subject to any disclaimer, the term of this patent is extended or adjusted under 35 U.S.C. 154(b) by 107 days.

(21) Appl. No.: 17/624,256

(22) PCT Filed: Dec. 11, 2020

(86) PCT No.: PCT/CN2020/135891
§ 371 (c)(1),
(2) Date: Dec. 31, 2021

(87) PCT Pub. No.: WO2021/129424
PCT Pub. Date: Jul. 1, 2021

(65) Prior Publication Data
US 2022/0325665 A1 Oct. 13, 2022

(30) Foreign Application Priority Data

Dec. 27, 2019 (CN) .......................... 201911371368.8

(51) Int. Cl.
*F01B 1/01* (2006.01)
*F01B 23/10* (2006.01)
(Continued)

(52) U.S. Cl.
CPC ............... *F01B 1/08* (2013.01); *F01B 23/10* (2013.01); *F01B 29/12* (2013.01)

(58) Field of Classification Search
CPC ............. F01B 1/08; F01B 29/12; F01B 23/10
See application file for complete search history.

(56) References Cited

U.S. PATENT DOCUMENTS

2002/0029558 A1* 3/2002 Tamaro ................. F01K 23/101
60/39.182

FOREIGN PATENT DOCUMENTS

CN 103452670 A 12/2013
CN 103574982 A 2/2014
(Continued)

*Primary Examiner* — Kevin A Lathers
(74) *Attorney, Agent, or Firm* — Bayramoglu Law Offices LLC

(57) ABSTRACT

A combined circulating system of a micro gas turbine, a transportation means, and a charging system are provided. The circulating system includes the micro gas turbine, a heat exchange unit, a circulating water tank, a piston engine, and a power generating apparatus, wherein the micro gas turbine is provided with a regenerator; an exhaust port of the regenerator is connected with an air inlet of the heat exchange unit to provide a heat source to the heat exchange unit; the exhaust port of the heat exchange unit is led to atmosphere, a water inlet of the heat exchange unit is connected with a water outlet of the circulating water tank, and a steam outlet of the heat exchange unit is connected with the piston engine to enable high pressure steam to enter the piston engine to push the piston engine to produce work.

18 Claims, 5 Drawing Sheets

(51) Int. Cl.
     *F01B 29/12*      (2006.01)
     *F01B 1/08*      (2006.01)

(56) References Cited

FOREIGN PATENT DOCUMENTS

| | | |
|---|---|---|
| CN | 203532054 U | 4/2014 |
| CN | 111022188 A | 4/2020 |
| CN | 211474267 U | 9/2020 |
| DE | 102017120369 A1 | 3/2019 |

* cited by examiner

COMBINED CIRCULATING SYSTEM OF MICRO GAS TURBINE, TRANSPORTATION MEANS AND CHARGING SYSTEM

CROSS REFERENCE TO THE RELATED APPLICATIONS

This application is the national phase entry of International Application No. PCT/CN2020/135891, filed on Dec. 11, 2020, which is based upon and claims priority to Chinese Patent Application No. 201911371368.8, filed on Dec. 27, 2019, the entire contents of which are incorporated herein by reference.

TECHNICAL FIELD

The present invention relates to the technical field of energy recovery, in particular to a combined circulating system of a micro gas turbine, a transportation means and a charging system.

BACKGROUND

The micro gas turbine is a small heat engine developed recently. The single power range is 25-300 kW and the basic technical characteristic is radial flow impeller machinery and regenerative cycle. In the prior art, a regenerator is usually adopted to recycle heat of exhausted gas of the micro gas turbine, and then tail gas passing through the regenerator is discharged to atmosphere. However, the tail gas passing through the regenerator still has certain waste heat. In the prior art, energy of the tail gas discharged by the regenerator is recycled by adopting a rotating machine such as a turbine, so that energy of the tail gas is recycled. However, for the small power micro gas turbine, as the temperature of the tail gas discharged by the regenerator is relatively low, and meanwhile, the amount of the tail gas is small, the rotating machine may not recover the part of energy effectively.

SUMMARY

In order to solve the technical problem, an objective of the present invention is to provide a combined circulating system of a micro gas turbine, a transportation means and a charging system. The circulating system may further recycle heat carried in exhaust gas of the regenerator, so that the efficiency of the whole micro gas turbine is further improved. Specifically, the present invention recycles energy carried in the exhausted gas of the regenerator efficiently by way of using a piston engine, that is, a combined circulating system of the micro gas turbine and a steam engine is formed.

A technical scheme of the present invention is as follows:

According to one aspect of the present invention, provided is a combined circulating system of a micro gas turbine, including a micro gas turbine, a heat exchange unit, a circulating water tank, a piston engine and a power generating apparatus, wherein the micro gas turbine is provided with a regenerator; an exhaust port of the regenerator is connected with an air inlet of the heat exchange unit to provide a heat source to the heat exchange unit;

the exhaust port of the heat exchange unit is led to an atmosphere, a water inlet of the heat exchange unit is connected with a water outlet of the circulating water tank, and a steam outlet of the heat exchange unit is connected with the piston engine to enable high pressure steam to enter the piston engine to push the piston engine to act;

the piston engine is connected with the power generating apparatus to drive the power generating apparatus to generate electricity;

the circulating water tank is connected with the piston engine to recover water or a water-vapor mixture converted after working steam produces work.

Further, the piston engine is a single-side entry spring reset type piston engine or a double-side entry type piston engine or a horizontally-opposed double-cylinder controlled piston engine;

the single-side entry spring reset type piston engine includes:

an air cylinder block, a piston, a spring, a piston rod, a slider-crank mechanism and an output shaft, wherein the piston is mounted in the air cylinder block, one end of the piston rod is connected with the piston and the other end of the piston rod stretches out of the air cylinder block and is connected with the slider-crank mechanism, the slider-crank mechanism is connected with the output shaft, and the output shaft is connected with the power generating apparatus;

one side of a rodless cavity of the air cylinder block is provided with a first air inlet and a first exhaust port, the first air inlet is connected with the heat exchange unit, the first exhaust unit is connected with the circulating water tank, and one side of a rod-containing cavity of the air cylinder block is provided with the spring to reset the piston that produces work;

the double-side entry type piston engine includes:

an air cylinder block, a piston, a piston rod, a slider-crank mechanism and an output shaft, wherein the piston is mounted in the air cylinder block, one end of the piston rod is connected with the piston and the other end of the piston rod stretches out of the air cylinder block and is connected with the slider-crank mechanism, the slider-crank mechanism is connected with the output shaft, and the output shaft is connected with the power generating apparatus;

one side of a rodless cavity of the air cylinder block is provided with a first air inlet and a first exhaust port, one side of a rod-containing cavity of the air cylinder block is provided with a second air inlet and a second exhaust port, the first air inlet and the second air inlet are connected with the heat exchange unit, and the first exhaust port and the second exhaust port are connected with the circulating water tank;

the horizontally-opposed double-cylinder controlled piston engine comprises:

a slider-crank mechanism, and a first air cylinder and a second air cylinder that are oppositely arranged on two sides of the slider-crank mechanism, wherein the slider-crank mechanism is of a double slide block structure, comprising a crank, a first slide block, a first connecting rod, a second slide block, a second connecting rod and an output shaft; the output shaft is arranged at a center of the crank in a penetrating manner, one end of the first connecting rod and one end of the second connecting rod are respectively connected to two end surfaces of the crank, connecting points thereof are distributed on two sides of the output shaft, the other end of the first connecting rod is connected with the first slide block and the other end of the second connecting rod is connected with the second slide block;

the first air cylinder comprises a first air cylinder block, a first piston and a first piston rod, the first piston is mounted in the first air cylinder block, one end of the first piston rod is connected with the first piston, and the other end of the first piston rod stretches out of the first air cylinder block and is connected with the first slide block; one side of a rodless cavity of the first air cylinder block is provided with a first air inlet and a first exhaust port, the first air inlet is connected with the heat exchange unit and the first exhaust port is connected with the circulating water tank; and the second air cylinder comprises a second air cylinder block, a second piston and a second piston rod, the second piston is mounted in the second air cylinder block, one end of the second piston rod is connected with the second piston, and the other end of the second piston rod stretches out of the second air cylinder block and is connected with the second slide block; one side of a rodless cavity of the second air cylinder block is provided with a second air inlet and a first exhaust port, the second air inlet is connected with the heat exchange unit and the second exhaust port is connected with the circulating water tank.

Further, the power generating apparatus is a linear generator, and the piston engine is the single-side entry spring reset type piston engine or the double-side entry type piston engine or the horizontally-opposed double-cylinder controlled piston engine;

the single-side entry spring reset type piston engine includes:

an air cylinder block, a piston, a spring and a piston rod, wherein the piston is mounted in the air cylinder block, one end of the piston rod is connected with the piston and the other end of the piston rod stretches out of the air cylinder block and is connected with the linear motor;

one side of a rodless cavity of the air cylinder block is provided with a first air inlet and a first exhaust port, the first air inlet is connected with the heat exchange unit, the first exhaust unit is connected with the circulating water tank, and one side of a rod-containing cavity of the air cylinder block is provided with the spring to reset the piston that produces work;

the double-side entry type piston engine comprises:

an air cylinder block, a piston and a piston rod, wherein the piston is mounted in the air cylinder block, one end of the piston rod is connected with the piston and the other end of the piston rod stretches out of the air cylinder block and is connected with the linear motor;

one side of a rodless cavity of the air cylinder block is provided with a first air inlet and a first exhaust port, one side of a rod-containing cavity of the air cylinder block is provided with a second air inlet and a second exhaust port, the first air inlet and the second air inlet are connected with the heat exchange unit, and the first exhaust port and the second exhaust port are connected with the circulating water tank;

the horizontally-opposed double-cylinder controlled piston engine comprises:

a first air cylinder and a second air cylinder, wherein the first air cylinder comprises a first air cylinder block, a first piston and a first piston rod, the first piston is mounted in the first air cylinder block, one end of the first piston rod is connected with the first piston, and the other end of the first piston rod stretches out of the first air cylinder block and is connected with one end of the linear motor; one side of a rodless cavity of the first air cylinder block is provided with a first air inlet and a first exhaust port, the first air inlet is connected with the heat exchange unit and the first exhaust port is connected with the circulating water tank; and the second air cylinder comprises a second air cylinder block, a second piston and a second piston rod, the second piston is mounted in the second air cylinder block, one end of the second piston rod is connected with the second piston, and the other end of the second piston rod stretches out of the second air cylinder block and is connected with the other end of the linear motor; one side of a rodless cavity of the second air cylinder block is provided with a second air inlet and a first exhaust port, the second air inlet is connected with the heat exchange unit and the second exhaust port is connected with the circulating water tank.

Further, the first air inlet, the first exhaust port, the second air inlet and the second exhaust port are provided with switching valves, and the switching valves are mechanical switching valves or electric switching valves.

Further, the heat exchange unit is connected with the first air inlet and the second air inlet through an electromagnetic reversing valve when the piston engine is the single-side entry spring reset type piston engine or the horizontally-opposed double-cylinder controlled piston engine, and the first exhaust port and the second exhaust port are connected with the circulating water tank through the electromagnetic reversing valve.

Further, the rod-containing cavity of the first air cylinder is connected with a first vacuum pump and the rodless cavity of the second air cylinder is connected with a second vacuum pump when the piston engine is the horizontally-opposed double-cylinder controlled piston engine.

Further, there are a plurality of piston engines, and the plurality of piston engines are connected with the power generating apparatus via a same output shaft.

Further, the combined circulating system of a micro gas turbine further includes a heating element, the circulating water tank being connected with the heat exchange unit after passing through the heating element.

According to another aspect of the present invention, provided is a transportation means, including the combined circulating system, a circulating water tank of the combined circulating system being connected with a heat exchange unit after recovering heat dissipated by a heating element in the transportation means.

According to another aspect of the present invention, provided is a charging system, including the combined circulating system, a circulating water tank of the combined circulating system being connected with a heat exchange unit after recovering heat dissipated by a heating element in the charging system.

Compared with the prior art, the present invention has the following beneficial effects:

1. In the present invention, by adopting a principle of recovering heat in the exhausted gas of the regenerator of the micro gas turbine by a piston engine, the technical problem that heat may not be recovered efficiently as the heat value of the exhaust gas is relatively low and the heat is relatively small in the prior art.

2. The structural form of the piston engine provided in the present invention is diversified, easy to realize and suitable for different scenes.

3. The power generating apparatus in the present invention may adopt a principle of a linear motor and is simple in structure.

4. There may be a plurality of piston engines, so that the efficiency of recovering waste heat thereby is higher.

5. The piston engine in the present invention is provided with a vacuum pump, so that the recovery rate of waste heat in the exhaust gas may be improved.

6. The piston engine in the present invention is free of lubricating oil and lubricating grease, so that the integral structure is simple.

7. The combined circulating system in the present invention may further recover heat dissipated by heating elements such as an engine shell, a battery pack and an engine.

DETAILED DESCRIPTION OF THE EMBODIMENTS

In order to better understand the technical scheme of the present invention, further description of the present invention will be made below in combination with specific embodiments and drawings of the description.

According to one aspect of the present invention, provided is a combined circulating system of a micro gas turbine.

Figure 1:
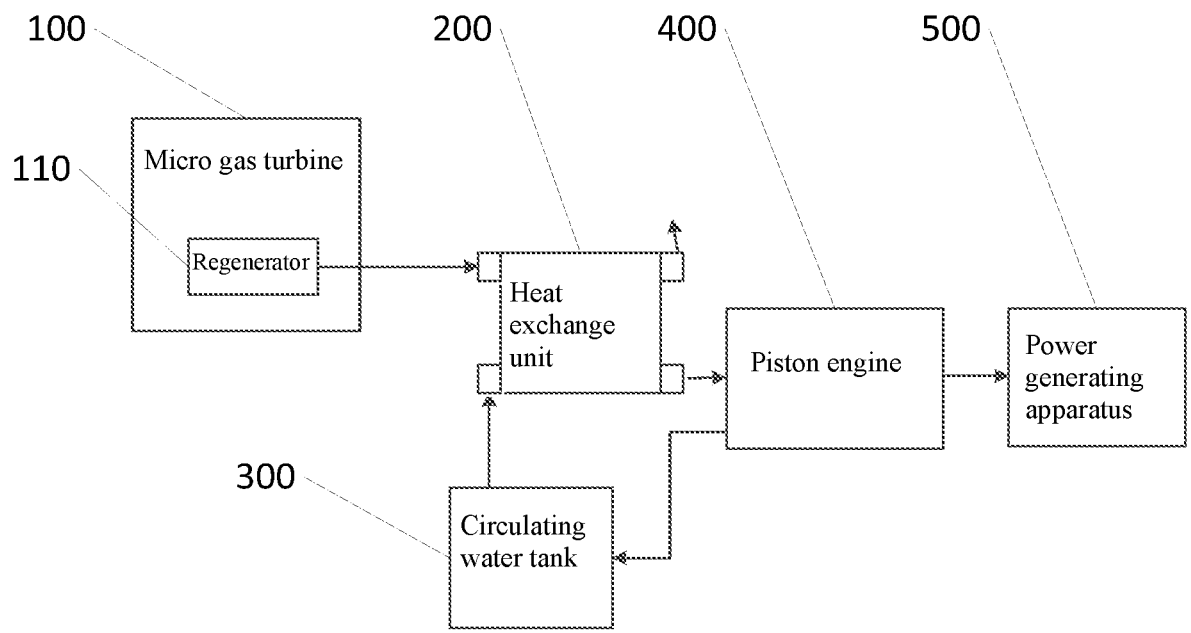
FIG. 1 is a system block diagram of the present invention.

As shown in FIG. 1, the combined circulating system of the micro gas turbine of the present invention includes: a micro gas turbine 100, a heat exchange unit 200, a circulating water tank 300, a piston engine 400 and a power generating apparatus 500, wherein the micro gas turbine 100 is provided with a regenerator 110; an exhaust port of the regenerator 110 is connected with an air inlet of the heat exchange unit 200 to provide a heat source to the heat exchange unit 200; the exhaust port of the heat exchange unit 200 is led to an atmosphere, a water inlet of the heat exchange unit 200 is connected with a water outlet of the circulating water tank 300, a steam outlet of the heat exchange unit 200 is connected with the piston engine 400, high pressure steam enters the piston engine 400 via the steam outlet to push the piston engine 400 to act; the piston engine 400 is connected with the power generating apparatus 500 to drive the power generating apparatus 500 to generate electricity; the circulating water tank 300 is connected with the piston engine 400 to recover water or a water-vapor mixture converted from acting steam that produces work.

Through the structure, tail gas discharged by the regenerator 110 of the micro gas turbine 100 is conveyed to the heat exchange unit 200, and meanwhile, the circulating water tank 300 conveys constant temperature water to the heat exchange unit 200, in the heat exchange unit 200, the constant temperature water absorbs heat in the tail gas and is gasified in the heat exchange unit 200 to form high pressure steam, the high pressure steam enters the piston engine 400 to push the piston to act, and the high pressure steam acting becomes constant pressure steam or a water-vapor mixture to enter the circulating water tank 300 to realize cyclic utilization. Heat in the exhaust gas of the regenerator 110 is utilized effectively, so that the integral efficiency of the micro gas turbine is improved.

The structure of the piston engine of the present invention may be realized by various structures, for example, but not limited to several structures below.

Example I

Figure 2:
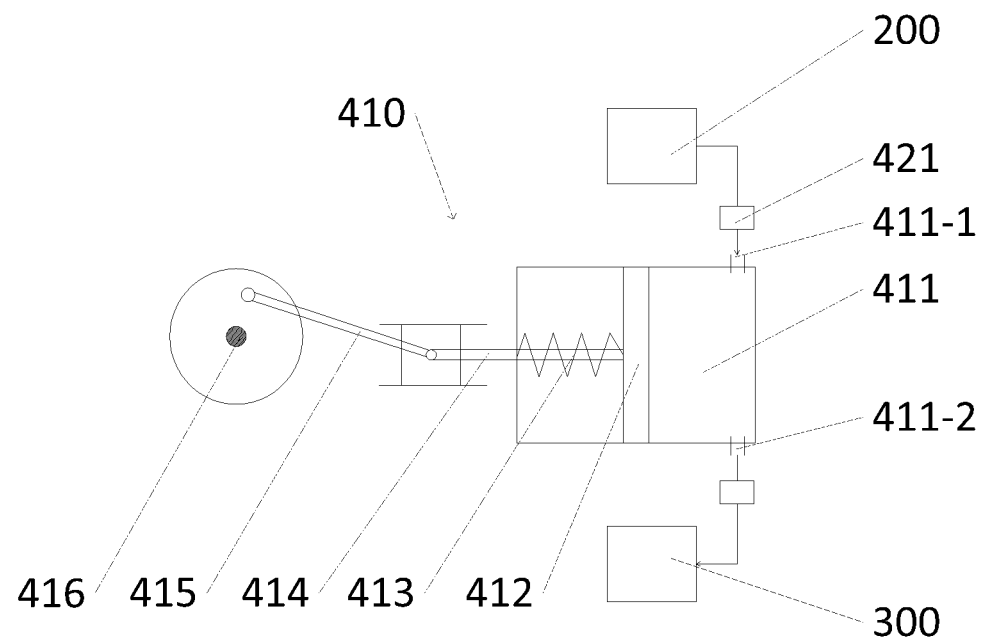
FIG. 2 is a structural diagram of an embodiment I of the present invention.

In the embodiment, the piston engine 400 is the single-side entry spring reset type piston engine 410. As shown in FIG. 2, the piston engine includes an air cylinder block 411, a piston 412, a spring 413, a piston rod 414, a slider-crank mechanism 415 and an output shaft 416, wherein the piston 412 is mounted in the air cylinder block 411, one end of the piston rod 414 is connected with the piston 412 and the other end of the piston rod stretches out of the air cylinder block 411 and is connected with the slider-crank mechanism 415, the slider-crank mechanism 415 is connected with the output shaft 416, a rodless cavity of the air cylinder block 411 is provided with a first air inlet 411-1 and a first exhaust port 411-2, the first air inlet 411-1 is connected with the heat exchange unit 200, the first exhaust port 411-2 is connected with the circulating water tank 300, and the output shaft 416 is connected with a power generating apparatus 500; and one side of a rod-containing cavity of the air cylinder block 411 is provided with the spring 413 to reset the piston 412 that produces work.

Preferably, switching valves 421 may be arranged among the first air inlet 411-1, the first exhaust port 411-2 and the air cylinder block 411, and on-off of the switching valves 421 is controlled according to a specific working state of the piston engine, so that action of the piston engine is controlled.

Specifically, the switching valves 421 may be mechanical switching valves or electric switching valves. The electric switching valve is relatively simple in principle to merely meet high frequency on-off. However, it needs to bear relatively high temperature and pressure. The mechanical switching valve needs to be combined with movement of the piston itself, and they are linked, so that frequency limit of process control is omitted, and it will be more complex in structure.

In a working state, the high pressure steam enters the rodless cavity of the piston engine via the first air inlet 411-1 through the heat exchange unit 200 to push the piston 412 to move linearly, the piston 412 converts linear motion of the piston 412 into a rotating motion of the output shaft 416 via a crank-link mechanism 415, and the output shaft 416 drives the power generating apparatus 500 to generate electricity; after acting, the spring 413 pushes the piston 412 to reset, and exhaust gas or the steam-vapor mixture in the rodless cavity of the piston engine enters the circulating water tank 300 via the first exhaust port 411-2 to be recycled.

Example II

Figure 3:
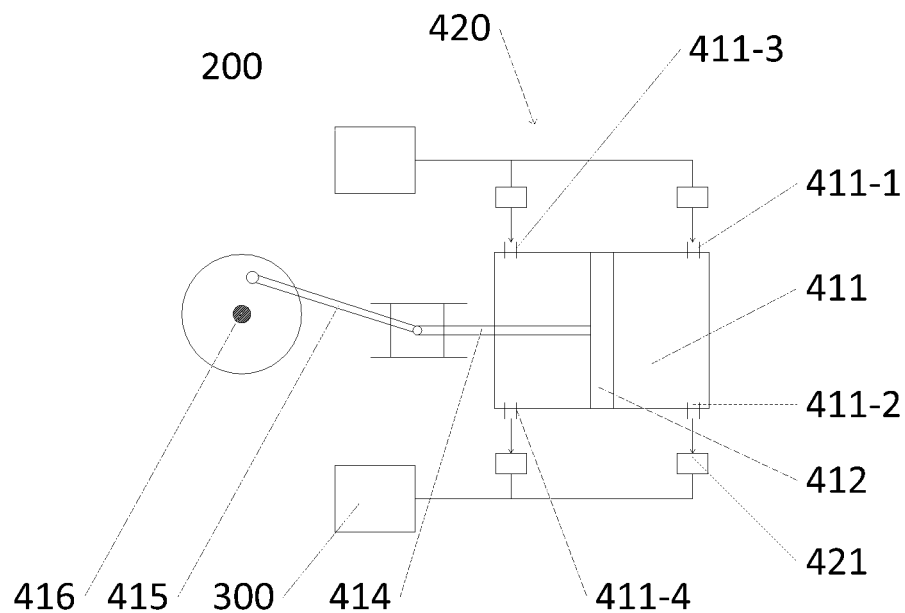
FIG. 3 is a structural diagram of an embodiment II of the present invention.

In the embodiment, the piston engine 400 is the double-side entry type piston engine 420. As shown in FIG. 3, based on the embodiment I, the spring 413 is omitted, and meanwhile, one side of the rod-containing cavity of the air cylinder block 411 is provided with a second air inlet 411-3 and a second exhaust port 411-4, the second air inlet 411-3 is connected with the heat exchange unit 200, the second exhaust port 411-4 is connected with the circulating water tank 300, and other structures are as same as those in the embodiment I, which is not described and annotated repeatedly.

In a working state, the high pressure steam enters the rodless cavity of the piston engine via the first air inlet 411-1 through the heat exchange unit 200 to push the piston 412 to move linearly, the piston 412 converts linear motion of the piston 412 into a rotating motion of the output shaft 416 via a crank-link mechanism 415, and the output shaft 416 drives the power generating apparatus 500 to generate electricity; after acting, the high pressure steam enters the rod-containing cavity of the piston engine via the second air inlet 411-3 to push the piston 412 to move towards the rodless cavity, exhaust gas or the steam-vapor mixture in the rodless cavity of the piston engine enters the circulating water tank 300 via the first exhaust port 411-2 to be recycled and then enters a next cycle period, the high pressure steam enters the rodless cavity of the piston engine via the first air inlet 411-1 to push the piston 412 to act, and exhaust gas or the steam-vapor mixture in the rod-containing cavity of the piston engine enters the circulating water tank 300 via the second exhaust port 411-4 to be recycled.

Preferably, switching valves 421 may be arranged among the first air inlet 411-1, the first exhaust port 411-2, the second air inlet 411-3, the second exhaust port 411-4 and the air cylinder block 411, and on-off of the switching valves 421 is controlled according to a specific working state of the piston engine, so that reciprocating motion of the piston engine is controlled; the switching valves 421 may be mechanical switching valves or electric switching valves.

Compared with the embodiment I, the spring is omitted in the embodiment. The reciprocating motion of the piston is realized by air intake and exhaust on two sides, so that the control reliability of the piston engine is improved and the structure is simplified.

Example III

Figure 4:
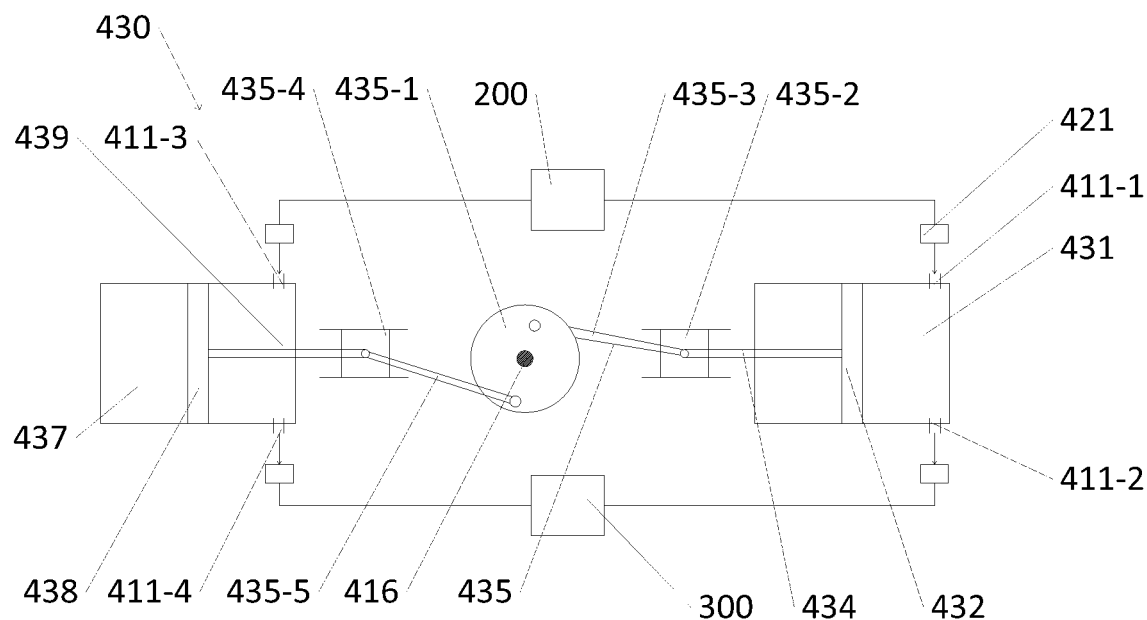
FIG. 4 is a structural diagram of an embodiment III of the present invention.
Figure 5:
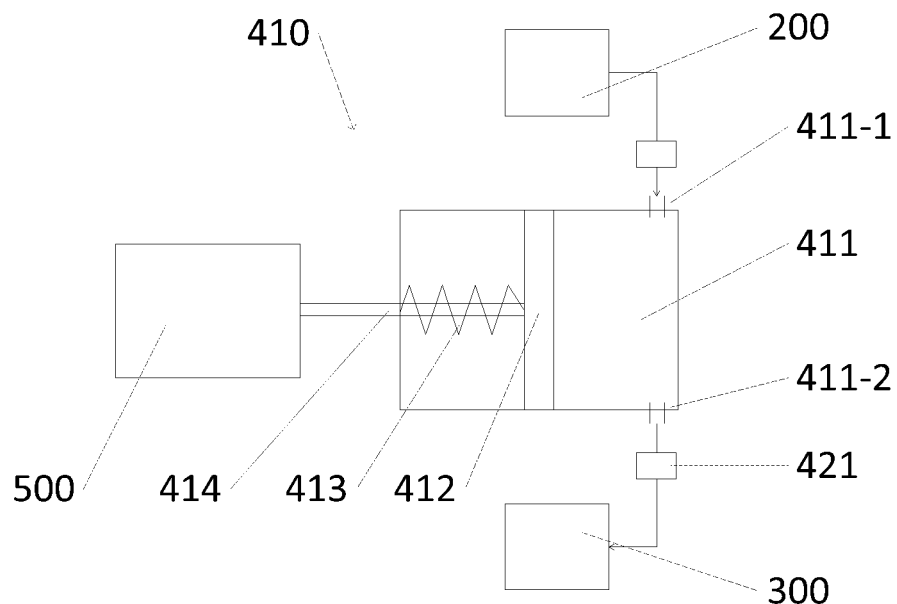
FIG. 5 is a structural diagram of an embodiment IV of the present invention.
Figure 6:
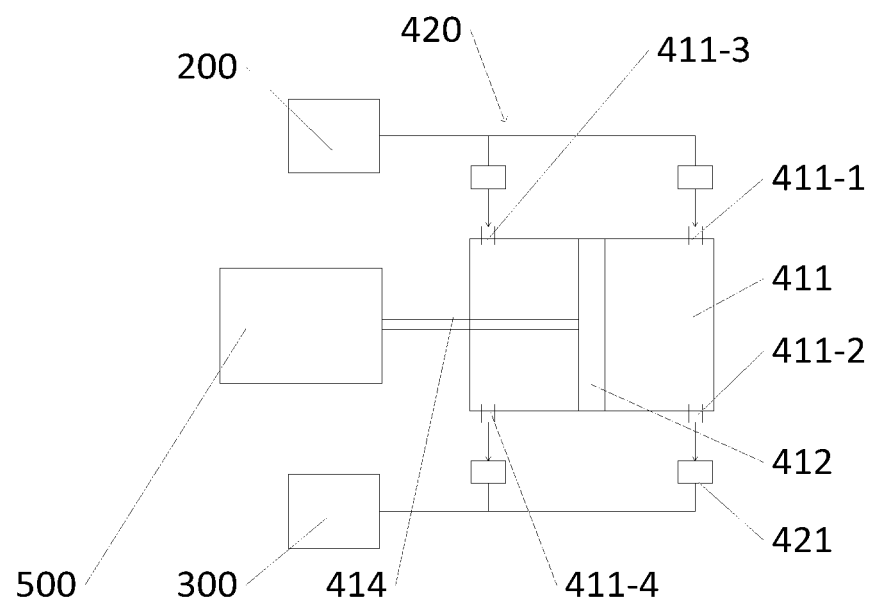
FIG. 6 is a structural diagram of an embodiment V of the present invention.

In the embodiment, the piston engine 400 is the horizontally-opposed double-cylinder control type piston engine 430. As shown in FIG. 4, the horizontally-opposed double-cylinder control type piston engine 430 includes a slider-crank mechanism 435, and a first air cylinder and a second air cylinder that are oppositely arranged on two sides of the slider-crank mechanism 435.

The slider-crank mechanism 435 is of a double slide block structure, including a crank 435-1, a first slide block 435-2, a first connecting rod 435-3, a second slide block 435-4, a second connecting rod 435-5 and an output shaft 416; the output shaft 416 is arranged at a center of the crank 435-1 in a penetrating manner, one end of the first connecting rod 435-3 and one end of the second connecting rod 435-5 are respectively connected to two end surfaces of the crank 435-1, connecting points are distributed on two sides of the output shaft 416, the other end of the first connecting rod 435-3 is connected with the first slide block 435-2 and the other end of the second connecting rod 435-5 is connected with the second slide block 435-4.

The first air cylinder includes a first air cylinder block 431, a first piston 432 and a first piston rod 434, the first piston 432 is mounted in the first air cylinder block 431, one end of the first piston rod 434 is connected with the first piston 432, and the other end of the first piston rod stretches out of the first air cylinder block 431 and is connected with the first slide block 435-2; one side of a rodless cavity of the first air cylinder block 431 is provided with a first air inlet 411-1 and a first exhaust port 411-2, the first air inlet 411-1 is connected with the heat exchange unit 200 and the first exhaust port 411-2 is connected with the circulating water tank 300.

The second air cylinder includes a second air cylinder block 437, a second piston 438 and a second piston rod 439, the second piston 439 is mounted in the second air cylinder block 437, one end of the second piston rod 439 is connected with the second piston 438, and the other end of the second piston rod stretches out of the second air cylinder block 437 and is connected with the second slide block 435-4; one side of a rodless cavity of the second air cylinder block 437 is provided with a second air inlet 411-3 and a first exhaust port 411-4, the second air inlet 411-3 is connected with the heat exchange unit 200 and the second exhaust port 411-4 is connected with the circulating water tank 300.

In a working state, the high pressure steam enters the rodless cavity of the first cylinder via the first air inlet 411-1 through the heat exchange unit 200 to push the piston 412 to move linearly, a first piston 432 converts linear motion of the first piston 432 into a rotating motion of the output shaft 416 via a crank-link mechanism 435, and the output shaft 416 drives the power generating apparatus 500 to generate electricity; after acting, the high pressure steam enters the rod-containing cavity of the second air cylinder via the second air inlet 411-3 to push the second piston 438 to move towards one side of the rodless cavity, exhaust gas or the steam-vapor mixture in the rodless cavity of the first air cylinder enters the circulating water tank 300 via the first exhaust port 411-2, and after the second air cylinder acts, the high pressure steam then enters the first air cylinder to act continuously, and cycle is repeated to realize continuous work of the output shaft 416.

It is illustrated that in the graphic structure, when the high pressure steam enters the first air cylinder, the first piston rod 434 drives the crank 435-1 of the slider-crank mechanism 435 to rotate, the crank 435-1 rotates anti-clockwise, and in the process, the crank 435-1 simultaneously drives the second piston rod 439 to move, the second piston rod 439 drives the second piston 438 to move towards one side of the crank 435-1. When it rotates to a preset angle and the high pressure steam enters the second air cylinder to act, the second piston 438 drives the second piston rod 439 to move towards the side away from the crank 435-1, and the crank 435-1 rotates continuously anti-clockwise. At the moment, the exhaust gas or the water-vapor mixture in the rodless cavity of the first air cylinder enters the circulating water tank 300 via the first exhaust port 411-2. In the continuous acting process, when the first air cylinder intakes air to act, the second air cylinder exhausts, and when the second air cylinder intakes air to act, the first air cylinder exhausts, thereby realizing cyclic action.

Certainly, the above description is merely a description of a specific working process in a specific implementation mode and does not limit the implementation process and its structure of the present invention.

Preferably, switching valves 421 may be arranged among the first air inlet 411-1, the first exhaust port 411-2, the second air inlet 411-3, the second exhaust port 411-4 and the air cylinder block, and on-off of the switching valves 421 is controlled according to a specific working state of the piston engine, so that reciprocating motion of the piston engine is controlled. Specifically, the switching valves 421 may be mechanical switching valves or electric switching valves.

Preferably, the heat exchange unit 200 may be connected with the first air inlet 411-1 and the second air inlet 411-3 through the electromagnetic reversing valve, the first exhaust port 411-2 and the second exhaust port 411-4 are connected with the circulating water tank 300 through the electromagnetic reversing valve, and action of the first air cylinder and the second air cylinder may be controlled by controlling action of the electromagnetic reversing valve, so that it is simpler and more accurate to control the piston engine.

In three structures disclosed in embodiments I, II and III, the specific structure of the piston engine 400 is an air cylinder driven crank-link structure, that is, a straight reciprocating motion of the piston is converted into a rotating motion of the crank and then the power generating apparatus 500 is driven to generate electricity; besides the structure, a linear motor may be used, that is, the power generating apparatus 500 is a linear generator, the piston is directly connected to the linear motor, and the linear motion of the piston drives the linear motor directly to generate electricity. Thus, the integral structure may be further simplified. When the usage scenario is limited and it is not suitable for the three structures, the structure of the embodiment below may be used. A specific structure has a principle below:

Example IV

In the embodiment, the piston engine 400 is the single-side entry spring reset type piston engine 410, including:
an air cylinder block 411, a piston 412, a spring 413 and a piston rod 414,
wherein the piston 412 is mounted in the air cylinder block 411, one end of the piston rod 414 is connected with the piston 412 and the other end of the piston rod stretches out of the air cylinder block 411 and is connected with the linear generator;
one side of a rodless cavity of the air cylinder block 411 is provided with a first air inlet 411-1 and a first exhaust port 411-2, the first air inlet 411-1 is connected with the heat exchange unit 200, the first exhaust port 411-2 is connected with the circulating water tank, 300 and one side of a rod-containing cavity of the air cylinder block 411 is provided with the spring 413 to reset the piston 412 that produces work.

Example V

In the embodiment, the piston engine 400 is the double-side entry type piston engine 420, including:
an air cylinder block 411, a piston 412 and a piston rod 414,
wherein the piston 412 is mounted in the air cylinder block 411, one end of the piston rod 414 is connected with the piston 412 and the other end of the piston rod stretches out of the air cylinder block 411 and is connected with the linear generator;
one side of the rodless cavity of the air cylinder block 411 is provided with a first air inlet 411-1 and a first exhaust port 411-2, one side of a rod-containing cavity of the air cylinder block 411 is provided with a second air inlet 411-3 and a second exhaust port 411-4, the first air inlet 411-1 and the second air inlet 411-3 are connected with the heat exchange unit 200, and the first exhaust port 411-2 and the second exhaust port 411-4 are connected with the circulating water tank 300.

Example VI

In the embodiment, the piston engine 400 is the horizontally-opposed double-cylinder control type piston engine 430, including:
a first air cylinder and a second air cylinder,
wherein the first air cylinder includes a first air cylinder block 431, a first piston 432 and a first piston rod 434, the first piston 432 is mounted in the first air cylinder block 431, one end of the first piston rod 434 is connected with the first piston 432, and the other end of the first piston rod stretches out of the first air cylinder block 431 and is connected with one end of the linear generator; one side of a rodless cavity of the first air cylinder block is provided with a first air inlet 411-1 and a first exhaust port 411-2, the first air inlet 411-1 is connected with the heat exchange unit 200 and the first exhaust port 411-2 is connected with the circulating water tank 300.

The second air cylinder includes a second air cylinder block 437, a second piston 438 and a second piston rod 439, the second piston 439 is mounted in the second air cylinder block 437, one end of the second piston rod 439 is connected with the second piston 438, and the other end of the second piston rod stretches out of the second air cylinder block 437 and is connected with the other end of the linear generator; one side of a rodless cavity of the second air cylinder block 437 is provided with a second air inlet 411-3 and a first exhaust port 411-4, the second air inlet 411-3 is connected with the heat exchange unit 200 and the second exhaust port 411-4 is connected with the circulating water tank 300.

According to a technology disclosed by the abovementioned embodiments, the structure of the power generating apparatus may be optimally selected according to a working condition and a usage scenario.

In the abovementioned six structures, single piston engine is arranged to drive the power generating apparatus to work. Similarly, a plurality of piston engines may be arranged to drive the power generating apparatus to work. That is, there are a plurality of piston engines that correspondingly drive a plurality of cranks to rotate simultaneously. The plurality of cranks are mounted on the same output shaft that is connected with the power generating apparatus. Therefore, the operation reliability of the power generating apparatus may be improved, and meanwhile, the generating efficiency is improved.

Figure 7:
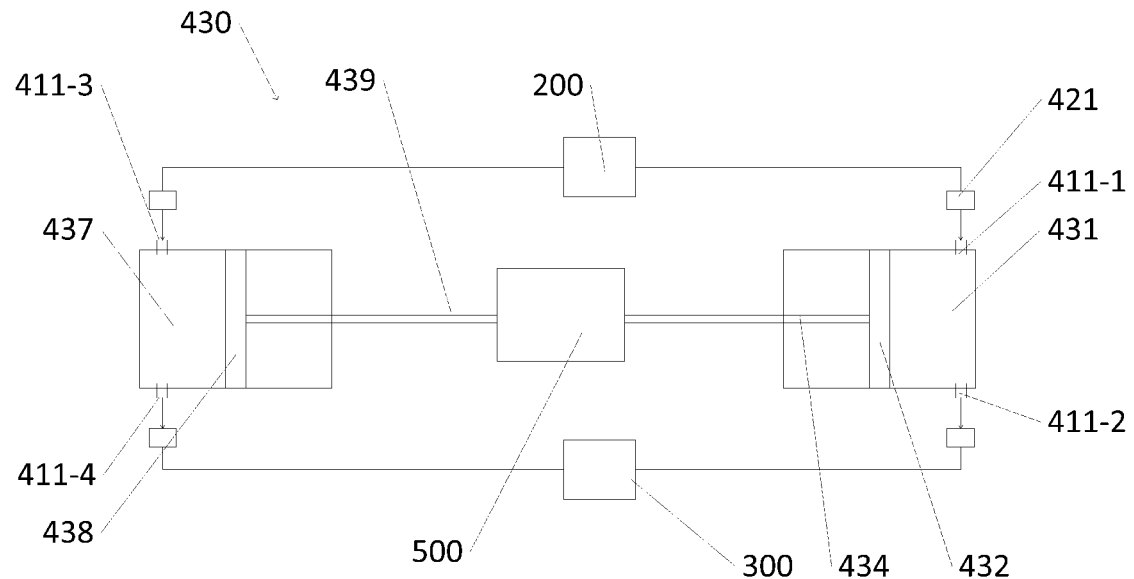
FIG. 7 is a structural diagram of an embodiment VI of the present invention.
Figure 8:
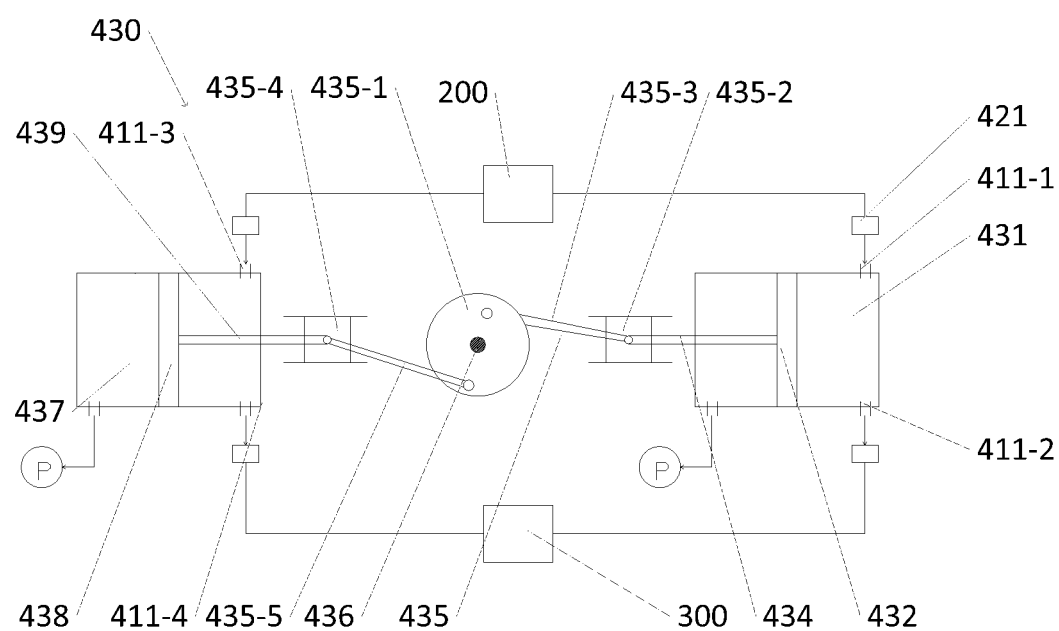
FIG. 8 is a structural diagram of FIG. 4 of the present invention when a vacuum pump is arranged.
Figure 9:
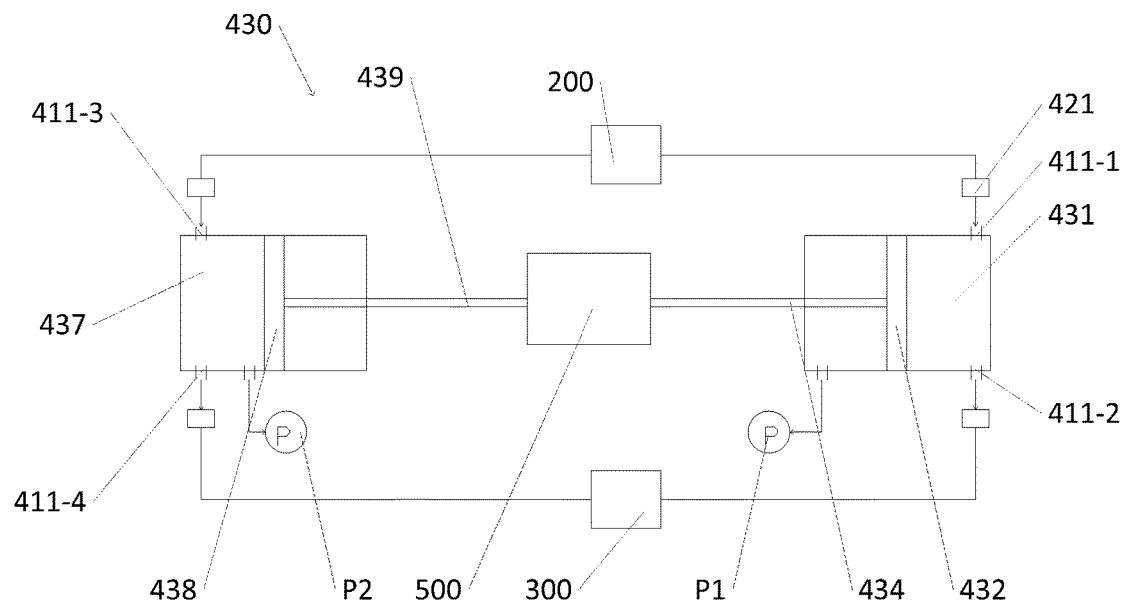
FIG. 9 is a structural diagram of FIG. 7 of the present invention when a vacuum pump is arranged.

Optionally, in the structures shown in FIG. 4 and FIG. 7, the rod-containing cavity of the first air cylinder and the rodless cavity of the second air cylinder are connected with a first vacuum pump P1 and a second vacuum pump P2, as shown in FIG. 8 and FIG. 9. When the first air cylinder or the second air cylinder act, corresponding vacuum pumps start to work simultaneously to pump corresponding chambers to negative pressure states.

As water vapor is used to expand the piston to act, when a backpressure is reduced, that is, the exhausting pressure is reduced by a vacuumizing method, there may be much liquid water in the water vapor that produces work condensed to generate more acting energy, so that the integral generating efficiency is improved. For example, when the pressure in the rod-containing cavity of the first cylinder block is a constant pressure, after steam in the rodless cavity of the first cylinder block acts, the pressure is 0.1 MPa, and after the pressure of the rod-containing cavity of the first air cylinder is pumped to 0.005 MPa via the vacuum pump, in two different backpressure conditions, under an isentropic condition, compared with the constant backpressure, the water vapor will release more energy at 0.005 MPa backpressure, so that the integral acting efficiency is improved by 5-8%.

In addition, as circulating water in the present invention is used to absorb waste heat discharged by the regenerator and then the piston is pushed to act, in the piston acting process, it is unnecessary to add lubricating oil and lubricating grease between the piston and the cylinder block and the piston is directly lubricated by water, so that it is unnecessary to arrange extra lubricating structure and lubricating oil supply structure and system, and therefore, the structure of the piston engine is simplified.

As a preferred scheme of the present invention, the combined circulating system of the micro gas turbine of the present invention may further recover waste heat of the micro gas turbine.

Figure 10:
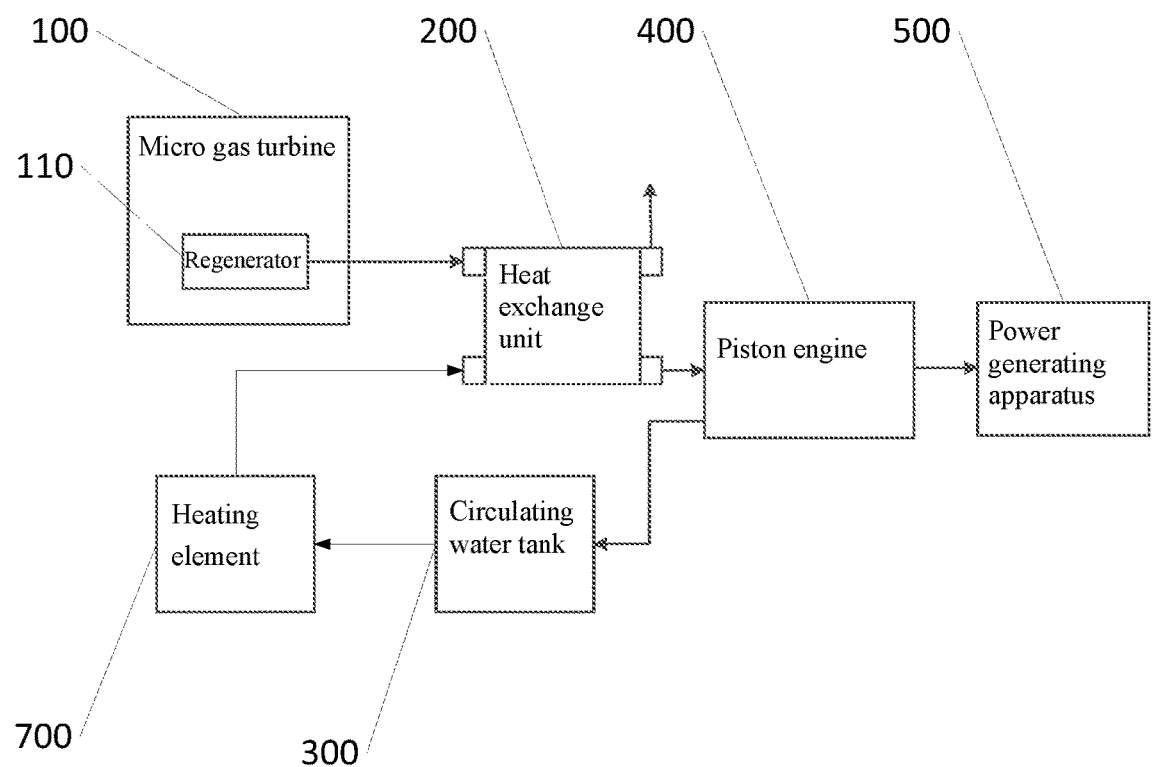
FIG. 10 is another system block diagram of the present invention.

As shown in FIG. 10, water in the circulating water tank 300 may exchange cold and heat with the heating element 700 first via the heating element 700, and the circulating water then enters the heat exchange unit 200 to exchange heat after the circulating water is raised from constant temperature to a certain temperature.

The heating element 700 generally refers to various elements with the temperatures increased in the working process, including a shell or a rotating shaft of the micro gas turbine 100, a shell of the power generating apparatus 500 and a heating part of a device using the micro gas turbine and the like. For example, the temperature of the gas turbine body shell is about 200° C., the temperature of the power generating apparatus shell is about 80° C., the heat exchange amount is relatively considerable, and specific heat exchange amount is affected by a series of factors such as volume, heat exchange pipe diameter and flow rate, which is no longer described in detail.

According to another aspect of the present invention, provided is a transportation means using the combined circulating system of the micro gas turbine. The circulating water may recover heat generated by a driving motor, a battery pack and an apparatus element in the transportation means first, and then enters the heat exchange unit 200 to exchange to recover heat dissipated by the driving motor, the battery pack and the apparatus element of the transportation tool so as to further improve the heat efficiency of the micro gas turbine.

According to another aspect of the present invention, provided is a charging system using the combined circulating system of the micro gas turbine. The circulating water may recover heat generated by the driving motor, the battery pack and the apparatus element in the charging system first, and then enters the heat exchange unit to exchange heat. The charging system may be a charging vehicle, a mobile charging station and the like.

An advanced micro gas turbine has a series of advanced technical characteristics such as multiple integrated dilatation, multiple fuels, low rate of fuel consumption, low noise, low emission, low vibration, low maintenance rate, remote control and diagnosis. Besides distributed power generation, the gas turbine may further be used for a standby power station, combined heat and power generation, grid connected power generation, peak load power generation and the like, is the optimum mode that provides clean, reliable, high quality, multipurpose and small distributed power generation and combined heating and power, and is suitable for either a central city or an exurban rural area and even a remote area.

The micro gas turbine is simple in structure and quite compact, saves the mounting space, is convenient to mount and carry quickly, and may meet small scale and scattered demand of distributed power supply well. The micro gas turbine is few in moving part, simple and compact in structure, so that the micro gas turbine is good in reliability and low in manufacturing cost and maintenance cost; and the micro gas turbine has the advantages of good environmental adaptability and high power supply quality.

The micro gas turbine may be used in distributed power generation. Compared with a central power station, the power station is closer to a user, so that the power station is better in reliability. As far as a terminal user is concerned, compared with other small power generating apparatuses, the micro gas turbine is a better environmental-friendly power generating apparatus, or is about to become one of basic constitutions of public utility in the future, and may operate in parallel to a central power plant.

The rotating speed of the 45 KW micro gas turbine with the regenerator is 0-80000 RPM. When the fuel is kerosene, the oil consumption is 200-500 g/kWh, and when the fuel is natural gas, the consumption of natural gas is 0.2-0.5 m3/kWh; the highest circulation power output power may reach 60 KW. The rotating speed of the 45 KW micro gas turbine without the regenerator is 0-80000 RPM. When the fuel is kerosene, the oil consumption is 400-900 g/kWh, and when the fuel is natural gas, the consumption of natural gas is 0.5-1 m3/kWh; the highest circulation power may reach 85 KW.

The above description is merely description of preferred embodiments of the present invention and applied technical principles. Those skilled in the art shall understand that the scope of the present invention in the present invention is not limited to the technical scheme specifically combined by the technical characteristics and shall cover other technical schemes formed by combining the technical characteristics or equivalent characteristics thereof without departing the concept of the present invention. For example, the characteristics have similar functions with those disclosed (but not limited to) in the present invention.

What is claimed is:

1. A combined circulating system of a micro gas turbine, comprising the micro gas turbine, a heat exchange unit, a circulating water tank, a piston engine, and a power generating apparatus, wherein the micro gas turbine is provided with a regenerator; an exhaust port of the regenerator is connected with an air inlet of the heat exchange unit to provide a heat source to the heat exchange unit;

an exhaust port of the heat exchange unit is led to an atmosphere, a water inlet of the heat exchange unit is connected with a water outlet of the circulating water tank, and a steam outlet of the heat exchange unit is connected with the piston engine to enable a working steam to enter the piston engine to push the piston engine to produce work;

the piston engine is connected with the power generating apparatus to drive the power generating apparatus to generate electricity;

the circulating water tank is connected with the piston engine to recover water or a water-vapor mixture converted after the working steam produces the work;

wherein the piston engine is a single-side entry spring reset type piston engine, or a double-side entry type piston engine, or a horizontally-opposed double-cylinder controlled piston engine;

the single-side entry spring reset type piston engine comprises:

an air cylinder block, a piston, a spring, a piston rod, a slider-crank mechanism, and an output shaft, wherein the piston is mounted in the air cylinder block, a first end of the piston rod is connected with the piston, and a second end of the piston rod stretches out of the air cylinder block and is connected with the slider-crank mechanism, the slider-crank mechanism is connected with the output shaft, and the output shaft is connected with the power generating apparatus;
one side of a rodless cavity of the air cylinder block is provided with a first air inlet and a first exhaust port, the first air inlet is connected with the heat exchange unit, a first exhaust unit is connected with the circulating water tank, and one side of a rod-containing cavity of the air cylinder block is provided with the spring to reset the piston producing the work;
the double-side entry type piston engine comprises:
an air cylinder block, a piston, a piston rod, a slider-crank mechanism, and an output shaft,
wherein the piston is mounted in the air cylinder block, a first end of the piston rod is connected with the piston, and a second end of the piston rod stretches out of the air cylinder block and is connected with the slider-crank mechanism, the slider-crank mechanism is connected with the output shaft, and the output shaft is connected with the power generating apparatus;
one side of a rodless cavity of the air cylinder block is provided with a first air inlet and a first exhaust port, one side of a rod-containing cavity of the air cylinder block is provided with a second air inlet and a second exhaust port, the first air inlet and the second air inlet are connected with the heat exchange unit, and the first exhaust port and the second exhaust port are connected with the circulating water tank;
the horizontally-opposed double-cylinder controlled piston engine comprises:
a slider-crank mechanism, and a first air cylinder and a second air cylinder, wherein the first air cylinder and the second air cylinder are oppositely arranged on two sides of the slider-crank mechanism,
wherein the slider-crank mechanism is of a double slide block structure, comprising a crank, a first slide block, a first connecting rod, a second slide block, a second connecting rod, and an output shaft; the output shaft is arranged at a center of the crank in a penetrating manner, a first end of the first connecting rod and a first end of the second connecting rod are respectively connected to two end surfaces of the crank, connecting points thereof are distributed on two sides of the output shaft, a second end of the first connecting rod is connected with the first slide block and a second end of the second connecting rod is connected with the second slide block;
the first air cylinder comprises a first air cylinder block, a first piston, and a first piston rod, the first piston is mounted in the first air cylinder block, a first end of the first piston rod is connected with the first piston, and a second end of the first piston rod stretches out of the first air cylinder block and is connected with the first slide block; one side of a rodless cavity of the first air cylinder block is provided with a first air inlet and a first exhaust port, the first air inlet is connected with the heat exchange unit, and the first exhaust port is connected with the circulating water tank; and
the second air cylinder comprises a second air cylinder block, a second piston, and a second piston rod, the second piston is mounted in the second air cylinder block, a first end of the second piston rod is connected with the second piston, and a second end of the second piston rod stretches out of the second air cylinder block and is connected with the second slide block; one side of a rod-containing cavity of the second air cylinder block is provided with a second air inlet and a second exhaust port, the second air inlet is connected with the heat exchange unit, and the second exhaust port is connected with the circulating water tank.

2. The combined circulating system of the micro gas turbine according to claim 1, wherein the first air inlet, the first exhaust port, the second air inlet, and the second exhaust port are provided with switching valves, and the switching valves are mechanical switching valves or electric switching valves.

3. The combined circulating system of the micro gas turbine according to claim 1, wherein the heat exchange unit is connected with the first air inlet and the second air inlet through an electromagnetic reversing valve when the piston engine is the single-side entry spring reset type piston engine or the horizontally-opposed double-cylinder controlled piston engine, and the first exhaust port and the second exhaust port are connected with the circulating water tank through the electromagnetic reversing valve.

4. The combined circulating system of the micro gas turbine according to claim 1, wherein the rod-containing cavity of the first air cylinder is connected with a first vacuum pump, and the rodless cavity of the second air cylinder is connected with a second vacuum pump when the piston engine is the horizontally-opposed double-cylinder controlled piston engine.

5. The combined circulating system of the micro gas turbine according to claim 1, wherein a plurality of piston engines are arranged, and the plurality of piston engines are connected with the power generating apparatus via a same output shaft.

6. The combined circulating system of the micro gas turbine according to claim 1, further comprising a heating element wherein the circulating water tank is connected with the heat exchange unit after passing through the heating element.

7. A transportation means, comprising the combined circulating system according to claim 1, wherein the circulating water tank of the combined circulating system is connected with the heat exchange unit after recovering heat dissipated by a heating element in the transportation means.

8. The transportation means according to claim 7, wherein the first air inlet, the first exhaust port, the second air inlet, and the second exhaust port are provided with switching valves, and the switching valves are mechanical switching valves or electric switching valves.

9. The transportation means according to claim 7, wherein the heat exchange unit is connected with the first air inlet and the second air inlet through an electromagnetic reversing valve when the piston engine is the single-side entry spring reset type piston engine or the horizontally-opposed double-cylinder controlled piston engine, and the first exhaust port and the second exhaust port are connected with the circulating water tank through the electromagnetic reversing valve.

10. The transportation means according to claim 7, wherein the rod-containing cavity of the first air cylinder is connected with a first vacuum pump, and the rodless cavity of the second air cylinder is connected with a second vacuum pump when the piston engine is the horizontally-opposed double-cylinder controlled piston engine.

11. The transportation means according to claim 7, wherein a plurality of piston engines are arranged, and the plurality of piston engines are connected with the power generating apparatus via a same output shaft.

12. The transportation means according to claim 7, further comprising the heating element wherein the circulating water tank is connected with the heat exchange unit after passing through the heating element.

13. A charging system, comprising the combined circulating system according to claim 1, wherein the circulating water tank of the combined circulating system is connected with the heat exchange unit after recovering heat dissipated by a heating element in the charging system.

14. A combined circulating system of a micro gas turbine, comprising the micro gas turbine, a heat exchange unit, a circulating water tank, a piston engine, and a power generating apparatus,
   wherein the micro gas turbine is provided with a regenerator; an exhaust port of the regenerator is connected with an air inlet of the heat exchange unit to provide a heat source to the heat exchange unit;
   an exhaust port of the heat exchange unit is led to an atmosphere, a water inlet of the heat exchange unit is connected with a water outlet of the circulating water tank, and a steam outlet of the heat exchange unit is connected with the piston engine to enable a working steam to enter the piston engine to push the piston engine to produce work;
   the piston engine is connected with the power generating apparatus to drive the power generating apparatus to generate electricity;
   the circulating water tank is connected with the piston engine to recover water or a water-vapor mixture converted after the working steam produces the work;
   wherein the power generating apparatus is a linear generator, and the piston engine is a single-side entry spring reset type piston engine, or a double-side entry type piston engine, or a horizontally-opposed double-cylinder controlled piston engine;
   the single-side entry spring reset type piston engine comprises:
   an air cylinder block, a piston, a spring, and a piston rod,
   wherein the piston is mounted in the air cylinder block, a first end of the piston rod is connected with the piston, and a second end of the piston rod stretches out of the air cylinder block and is connected with a linear motor of the linear generator;
   one side of a rodless cavity of the air cylinder block is provided with a first air inlet and a first exhaust port, the first air inlet is connected with the heat exchange unit, a first exhaust unit is connected with the circulating water tank, and one side of a rod-containing cavity of the air cylinder block is provided with the spring to reset the piston producing the work;
   the double-side entry type piston engine comprises:
   an air cylinder block, a piston, and a piston rod,
   wherein the piston is mounted in the air cylinder block, a first end of the piston rod is connected with the piston, and a second end of the piston rod stretches out of the air cylinder block and is connected with the linear motor of the linear generator;
   one side of a rodless cavity of the air cylinder block is provided with a first air inlet and a first exhaust port, one side of a rod-containing cavity of the air cylinder block is provided with a second air inlet and a second exhaust port, the first air inlet and the second air inlet are connected with the heat exchange unit, and the first exhaust port and the second exhaust port are connected with the circulating water tank;
   the horizontally-opposed double-cylinder controlled piston engine comprises:
   a first air cylinder and a second air cylinder,
   wherein the first air cylinder comprises a first air cylinder block, a first piston, and a first piston rod, the first piston is mounted in the first air cylinder block, a first end of the first piston rod is connected with the first piston, and a second end of the first piston rod stretches out of the first air cylinder block and is connected with a first end of the linear motor of the linear generator; one side of a rodless cavity of the first air cylinder block is provided with a first air inlet and a first exhaust port, the first air inlet is connected with the heat exchange unit, and the first exhaust port is connected with the circulating water tank; and
   the second air cylinder comprises a second air cylinder block, a second piston, and a second piston rod, the second piston is mounted in the second air cylinder block, a first end of the second piston rod is connected with the second piston, and a second end of the second piston rod stretches out of the second air cylinder block connected with a second end of the linear motor of the linear generator; one side of a rod-containing cavity of the second air cylinder block is provided with a second air inlet and a second exhaust port, the second air inlet is connected with the heat exchange unit, and the second exhaust port is connected with the circulating water tank.

15. The combined circulating system of the micro gas turbine according to claim 14, wherein the first air inlet, the first exhaust port, the second air inlet, and the second exhaust port are provided with switching valves, and the switching valves are mechanical switching valves or electric switching valves.

16. The combined circulating system of the micro gas turbine according to claim 14, wherein the heat exchange unit is connected with the first air inlet and the second air inlet through an electromagnetic reversing valve when the piston engine is the single-side entry spring reset type piston engine or the horizontally-opposed double-cylinder controlled piston engine, and the first exhaust port and the second exhaust port are connected with the circulating water tank through the electromagnetic reversing valve.

17. The combined circulating system of the micro gas turbine according to claim 14, wherein the rod-containing cavity of the first air cylinder is connected with a first vacuum pump, and the rodless cavity of the second air cylinder is connected with a second vacuum pump when the piston engine is the horizontally-opposed double-cylinder controlled piston engine.

18. A transportation means of a combined circulating system of a micro gas turbine, wherein the combined circulating system comprises the micro gas turbine, a heat exchange unit, a circulating water tank, a piston engine, and a power generating apparatus,
   wherein the micro gas turbine is provided with a regenerator; an exhaust port of the regenerator is connected with an air inlet of the heat exchange unit to provide a heat source to the heat exchange unit;
   an exhaust port of the heat exchange unit is led to an atmosphere, a water inlet of the heat exchange unit is connected with a water outlet of the circulating water tank, and a steam outlet of the heat exchange unit is connected with the piston engine to enable a working steam to enter the piston engine to push the piston engine to produce work;
   the piston engine is connected with the power generating apparatus to drive the power generating apparatus to generate electricity;

the circulating water tank is connected with the piston engine to recover water or a water-vapor mixture converted after the working steam produces the work;

wherein the circulating water tank of the combined circulating system is connected with the heat exchange unit after recovering heat dissipated by a heating element in the transportation means;

wherein the power generating apparatus is a linear generator, and the piston engine is a single-side entry spring reset type piston engine, or a double-side entry type piston engine, or a horizontally-opposed double-cylinder controlled piston engine;

the single-side entry spring reset type piston engine comprises:

an air cylinder block, a piston, a spring, and a piston rod, wherein the piston is mounted in the air cylinder block, a first end of the piston rod is connected with the piston, and a second end of the piston rod stretches out of the air cylinder block and is connected with a linear motor of the linear generator;

one side of a rodless cavity of the air cylinder block is provided with a first air inlet and a first exhaust port, the first air inlet is connected with the heat exchange unit, a first exhaust unit is connected with the circulating water tank, and one side of a rod-containing cavity of the air cylinder block is provided with the spring to reset the piston producing the work;

the double-side entry type piston engine comprises:

an air cylinder block, a piston, and a piston rod, wherein the piston is mounted in the air cylinder block, a first end of the piston rod is connected with the piston, and a second end of the piston rod stretches out of the air cylinder block and is connected with the linear motor of the linear generator;

one side of a rodless cavity of the air cylinder block is provided with a first air inlet and a first exhaust port, one side of a rod-containing cavity of the air cylinder block is provided with a second air inlet and a second exhaust port, the first air inlet and the second air inlet are connected with the heat exchange unit, and the first exhaust port and the second exhaust port are connected with the circulating water tank;

the horizontally-opposed double-cylinder controlled piston engine comprises:

a first air cylinder and a second air cylinder, wherein the first air cylinder comprises a first air cylinder block, a first piston, and a first piston rod, the first piston is mounted in the first air cylinder block, a first end of the first piston rod is connected with the first piston, and a second end of the first piston rod stretches out of the first air cylinder block and is connected with a first end of the linear motor of the linear generator; one side of a rodless cavity of the first air cylinder block is provided with a first air inlet and a first exhaust port, the first air inlet is connected with the heat exchange unit, and the first exhaust port is connected with the circulating water tank; and the second air cylinder comprises a second air cylinder block, a second piston, and a second piston rod, the second piston is mounted in the second air cylinder block, a first end of the second piston rod is connected to the second piston, and a second end of the second piston rod stretches out of the second air cylinder block connected with a second end of the linear motor of the linear generator; one side of a rodless cavity of the second air cylinder block is provided with a second air inlet and a second exhaust port, the second air inlet is connected with the heat exchange unit, and the second exhaust port is connected with the circulating water tank.

* * * * *